(12) United States Patent
Izumo et al.

(10) Patent No.: US 9,097,607 B2
(45) Date of Patent: Aug. 4, 2015

(54) LEAKAGE TESTER FOR PIPETTES UTILIZING PRESSURE

(75) Inventors: Naoto Izumo, Kitamoto (JP); Takaaki Kagawa, Kitamoto (JP)

(73) Assignee: A&D Company Limited, Tokyo (JP)

( * ) Notice: Subject to any disclaimer, the term of this patent is extended or adjusted under 35 U.S.C. 154(b) by 307 days.

(21) Appl. No.: 13/502,445

(22) PCT Filed: Oct. 19, 2010

(86) PCT No.: PCT/JP2010/006181
§ 371 (c)(1),
(2), (4) Date: May 1, 2012

(87) PCT Pub. No.: WO2011/048793
PCT Pub. Date: Apr. 28, 2011

(65) Prior Publication Data
US 2012/0210772 A1    Aug. 23, 2012

(30) Foreign Application Priority Data

Oct. 20, 2009   (JP) .................................. 2009-241042

(51) Int. Cl.
*B01L 3/02*   (2006.01)
*G01M 3/26*   (2006.01)
*G01F 25/00*  (2006.01)

(52) U.S. Cl.
CPC .................. *G01M 3/26* (2013.01); *B01L 3/021* (2013.01); *G01F 25/0092* (2013.01); *B01L 2200/146* (2013.01)

(58) Field of Classification Search
CPC ..... G01M 3/26; B01L 3/021; B01L 2200/146
USPC ...... 73/1.73, 1.74, 40, 40.5 R, 40.7, 46, 49.2, 73/49.8, 863.31, 863.32, 864, 73/864.01–864.25; 422/500, 501
See application file for complete search history.

(56) References Cited

U.S. PATENT DOCUMENTS

RE26,661 E  *  9/1969  Fitzpatrick et al. ................ 73/40
4,103,537 A  *  8/1978  Victor ......................... 73/40.5 R
(Continued)

FOREIGN PATENT DOCUMENTS

JP       4019431      3/1992
JP       8320270      12/1996
(Continued)

OTHER PUBLICATIONS

AD-1690 Leak Tester, A & D Company, LTD., Copyright 2009.*
(Continued)

*Primary Examiner* — David A Rogers
(74) *Attorney, Agent, or Firm* — Roberts Mlotkowski Safran & Cole P.C.

(57) ABSTRACT

A portable, small-sized device is provided to accurately conduct a leakage test for a liquid volume meter such as a pipette. In operation, pipette P is connected to the device main body side via a tube. A command from a central processing unit causes a pump to perform a suctioning operation to depressurize the pipette P side to a predetermined pressure. Any pressure changes over a predetermined period of time are monitored by a pressure sensor. The central processing unit determines whether there is leakage from the pipette P, and displays a judgment result on a display unit. In particular, when a diaphragm pump is used as the pump, the pulsation of an air flow occurring in a suction operation is attenuated in a pressure vessel so as not to have harmful effects on either the inspection results or the pipette P side.

4 Claims, 4 Drawing Sheets

(56) References Cited

U.S. PATENT DOCUMENTS

| | | | | |
|---|---|---|---|---|
| 4,114,426 | A * | 9/1978 | McLean | 73/40.5 R |
| 5,226,314 | A * | 7/1993 | Baret | 73/40.7 |
| 5,537,880 | A | 7/1996 | Takeda et al. | |
| 5,798,696 | A * | 8/1998 | Wong | 340/605 |
| 6,370,942 | B1 * | 4/2002 | Dunfee et al. | 73/37 |
| 6,651,486 | B1 * | 11/2003 | Johnson et al. | 73/40 |
| 6,662,122 | B2 * | 12/2003 | Salje | 702/50 |
| 7,353,692 | B2 | 4/2008 | Gocho | |
| 7,926,325 | B2 * | 4/2011 | Kaplit | 73/37 |
| 8,530,242 | B2 * | 9/2013 | Lin et al. | 436/164 |
| 8,631,684 | B2 * | 1/2014 | Kosugi et al. | 73/40.5 R |
| 2003/0167826 | A1 * | 9/2003 | Holt | 73/40 |
| 2004/0139789 | A1 * | 7/2004 | Masters | 73/49.2 |
| 2009/0007638 | A1 * | 1/2009 | Meskouri et al. | 73/40 |
| 2009/0173136 | A1 * | 7/2009 | Brockmann | 73/1.58 |

FOREIGN PATENT DOCUMENTS

| | | |
|---|---|---|
| JP | 09-068474 | 3/1997 |
| JP | 10-096677 | 4/1998 |
| JP | 11-304633 | 11/1999 |
| JP | 2003-294570 | 10/2003 |
| JP | 2005-91042 | 4/2005 |
| JP | 3151843 U | 7/2009 |
| WO | 2004104544 | 12/2004 |
| WO | 2006073143 | 7/2006 |

OTHER PUBLICATIONS

International Search Report PCT/JP2010/006181 mailed Dec. 14, 2010.

European Search Report 10824646.3-1557/2492658 PCT/JP2010006181 dated Jan. 31, 2014.

Extract of International Written Opinion PCT/JP2010/006181 and its English Translation; Statement and English Translation of contents of Petition filed in response to International Written Opinion in corresponding national phase application in Japan, Apr. 20, 2012.

* cited by examiner

LEAKAGE TESTER FOR PIPETTES UTILIZING PRESSURE

TECHNICAL FIELD

The present invention relates to a device for testing performance of liquid metering equipment, specifically, a liquid metering dispenser called a pipette.

BACKGROUND ART

As a matter of course, from the nature of the equipment as a tool that suctions liquid and discharges a metered volume of liquid, it is assumed that a liquid metering dispensing device called a pipette or dispenser (hereinafter, referred to as "pipette") as one kind of liquid volume meter can perform proper discharge.

Here, pipettes as equipment for discharging a predetermined volume of liquid have been increasingly used according to diversification of technical fields and fields of use requiring discharging of a predetermined volume of liquid. For example, in line with an expanding market in, for example, the pharmaceutical industry and biotechnology-related industries, the sales volume has reached 2,000,000 per year around the world, and even now, it is expanding at a rate of approximately 5% per year. Pipettes themselves are not so expensive, so that it is not rare at the laboratory level that one researcher possesses about 10 pipettes.

On the other hand, according to advancements in technology, higher performance of pipettes has been demanded, and assurance of performance of pipettes has also been increasingly required. Therefore, at present, for maintaining performance, about 400,000 pipettes are inspected, calibrated, and repaired per year, and it is considered that the number of pipettes targeted for maintenance will further increase.

A pipette is configured to suction and discharge a predetermined volume of liquid by a change in capacity of a cylinder portion according to actuation of a piston that is actuated inside a main body formed as a cylinder. Therefore, the suction and discharge performance of a pipette depends on maintenance of airtightness of the device around the piston portion. Considering this, devices for conducting an inspection (leakage test) of airtightness of a device required to have airtightness have been proposed as described in the Patent Documents listed below, and it is considered that performance inspections of pipettes can be conducted by using these devices.

Patent Document 1: Japanese Published Examined Patent Application No. H04-019431
Patent Document 2: Japanese Published Unexamined Patent Application No. H08-320270
Patent Document 3: Japanese Published Unexamined Patent Application No. H10-096677
Patent Document 4: Japanese Published Unexamined Patent Application No. 2005-091042
Patent Document 5: U.S. Pat. No. 5,537,880

Problem to be Solved by the Invention

Devices disclosed in Patent Documents 1 to 3 of Patent Documents listed as the above purpose detection, etc., of leakage from piping systems, cracks of machine structures having hollow portions, and defectives of castings, are general-purpose leakage testing devices that are very large in size and expensive as a whole according to inspection targets, and further, equipped with a pump that is needlessly large and strong for inspection of pipettes, and therefore, not suitable for fine adjustment of pressure, and for these reasons, these devices have difficulty in being used for leakage tests for pipettes in actuality.

Next, the invention disclosed in Patent Document 4 is a device for inspecting airtightness of an endoscope, and it is possible that the device is constructed small in size, however, its purpose is only to inspect pinholes and looseness of junctions, etc., to prevent body fluids and disinfectants from entering the inside of the endoscope from the aspect of hygiene and safety, and the inspection is conducted just by measuring zero leakage or leakage, so that the device is not for measuring the performance of the endoscope.

Patent document 5 discloses a system installed in a large-sized automatic apparatus configured as an automatic pipette apparatus, and is configured to inspect suction performance of a pipette when the pipette is operated. This system has an aspect whose purpose is the same as that of the present invention in terms of performance inspection, however, it is a system installed in an automatic pipette apparatus that is very large in size and expensive, and the system is neither portable nor capable of inspecting a general-purpose pipette unlike the present invention described later.

Means for Solving the Problem

The present invention has been made in view of the above-described object.

That is, the present invention provides a device (hereinafter, referred to as "leakage tester utilizing pressure," or simply "leakage tester") for testing performance of a liquid volume meter such as a pipette, which is formed into a size to be easily carried about, and includes a pump, a pressure vessel, a valve (specifically, check valve), and a central control unit inside, where the pump is configured to be switched between air discharge and suction so that both pressurization and depressurization can be performed if necessary, a filter is disposed in a duct on the side to be connected to a pipette and configured to be positioned outside a case of the device if necessary.

Effects of the Invention

The device can be configured to a size capable of being easily carried about as a whole by a highly-reliable air pressure circuitry and a central processing unit (CPU) as a microcomputer that controls internal units, etc., so that the device can inspect a pipette anywhere.

A filter is disposed in an air passage (air suction/discharge), so that, for example, when a pipette is tested by means of air suction (depressurization), contamination, etc., adhering to the pipette is filtered out by this filter, so that the contamination can be prevented from entering the pump and pressure vessel, etc. In a test by means of discharge (pressurization), when dust, etc., are contained in the air to be discharged from the device side, the dust, etc., are also filtered out by the filter, so that the dust can also be prevented from entering the pipette side.

Further, by disposing the filter outside the case of the device, the filter can be replaced without opening the device.

By installing a pressure detector in the air passage and recording a pump discharge pressure or suction pressure in advance in a state where the filter is not clogged, a filter replacement time can be detected and informed by the central processing unit by measuring a change in this discharge pressure or suction pressure.

Further, by using not an electronic valve but a check valve with a simple structure and high reliability as the valve for preventing a backflow of fluid and using a lightweight and inexpensive diaphragm pump as the pump, the device can be made lightweight, small in size, inexpensive, and highly reliable as a whole.

First Embodiment

Hereinafter, embodiments of the present invention are described with reference to the drawings.

FIG. 1 and FIG. 2 show configurations of the present invention, and FIG. 1 shows a configuration in a case where a test is conducted by means of air suction, that is, by depressurizing a pipette as an inspection target, and FIG. 2 shows a configuration in a case where a test is conducted by air discharge, that is, by pressurizing a pipette as an inspection target. These configurations are basically the same. First, a configuration according to air suction is described as a first embodiment.

In FIG. 1, the reference numeral 1 denotes a case showing a device main body, and various configurations of this case are possible, and for example, the case is configured to have the shape shown in FIG. 4. In any case, the case 1 is configured to have a compact size and shape capable of being held with one hand.

Inside the case 1, a duct in which air flows is formed, and in this duct, a duct line to be directly connected to the outside of the device is referred to as an external connecting duct line L1, and a duct line which is directly connected to the external connecting duct line L1 and in which internal units are installed is referred to as an internal duct line L2. These names of duct lines L1 and L2 are provided only for convenience of description, and the duct lines are serial.

The external connecting duct line L1 is connected to main body connectors 2A and 2B formed on side surfaces of the case 1, respectively. On the other hand, at an end portion of the duct line L2, a pump 3 is disposed. Any kind of pump can be used as the pump 3 as long as the pump is small in size, however, in view of the size and cost, etc., for example, a diaphragm pump is appropriate.

As is clear from the configuration of the external connecting duct line L1, the main body connectors 2A and 2B are configured so that either one of the main body connectors can be selected and used. In the illustrated configuration, the main body connector 2A is used, and the main body connector 2B is not used. To the main body connector 2B that is not used, a member for closing the connector, such as a stopper plug 6 is fitted. Thus, by forming main body connectors on both side portions of the case 1, for example, even when one side of the device is in close contact with a wall or other device, the connector on the other open side surface can be used. In addition, this offers such convenience that the connector to be used can be selected according to right handedness and left handedness.

The reference numeral 5 denotes a pressure vessel provided in the internal duct line L2, and between this pressure vessel 5 and the pump 3, a check valve 4A is disposed. In the configuration of FIG. 1, the pump 3 is set to perform a suctioning operation, and the check valve 4A is provided for keeping, for a predetermined period of time, a negative pressure generated in the whole air flow channel from the pipette P to the pump 3 in response to stoppage of the pump 3 after the pump 3 is actuated for a predetermined period of time.

Here, although it is possible that a solenoid valve is provided in place of the check valve 4A (including the check valve 4B described later), provision of a check valve is technically or economically reasonable for the following reason. That is, a solenoid valve can open and close a liquid or gas flow circulation circuit in response to electric signals, so that a solenoid valve is very convenient for circuit control. However, a solenoid valve requires a DC power supply as a drive power supply (normal DC: 12V or 24V) such as a switching regulator separately, and is structurally complicated, heavy in weight, and expensive. A solenoid valve further has problems such as malfunctions that structurally easily occur and production of abrasion powder due to sliding operations of the respective portions when the valve is actuated, and therefore, a solenoid valve has technical and economical difficulties in use for the device of the present invention. In view of these points, the combination of the pump (diaphragm pump) and a check valve is reasonable as described above.

Next, the reference numeral 7 denotes a pressure sensor which detects the pressure inside the internal duct line L2. The reference numeral 8 denotes a central processing unit (CPU) for controlling the whole device, which receives inputs of data detected by the pressure sensor 7 and controls the driving of the pump 3. The reference numeral 9 denotes a display unit for displaying data output from the central processing unit 8, which displays, for example, a depressurized state at the time of depressurization, results of inspection of a pipette as an inspection target, and replacement of the filter, etc.

The reference numeral 10 denotes a filter which is disposed in the internal duct line L2 on the air flow path, and this filter-disposed portion is configured to be disposed outside the case 1, and therefore, the filter 10 itself is disposed outside the case 1. Normally, the filter-disposed portion is disposed on the back surface or bottom surface, etc., of the device, however, it can be disposed on the front surface or side surface of the device. Of course, it is possible that a cover is disposed on the filter-disposed portion so that the filter 10 is normally not visible from the outside. With this configuration, the filter 10 can be replaced without opening the case 1.

Next, a performance inspection (leakage test) of a pipette P as an inspection target in a state where the pipette P is connected to the device main body by using a tube 11 is described in detail with reference mainly to FIG. 3. In FIG. 1, the reference numeral 12 denotes a connector provided on the tube 11, which is structured so as to divide the tube 11 into the main body connection side and the pipette connection side, however, this connector 12 provided on the tube 11 is not an essential constituent element of the present invention.

First, by pressing a start key (not shown) provided on the main body, the central processing unit 8 sends an actuation signal to the pump 3, the pump 3 is actuated and suctions air to the pump 3 side through the tube 11, the external connecting duct line L1, and the internal connecting duct line L2 to depressurize the pipette P side. In this case, when the pump 3 is a diaphragm pump, this causes pulsation of air suction, however, this pulsation is attenuated when the air passes through the pressure vessel 5, so that the pulsation does not have harmful effects on the inspection results or the pipette P side.

In FIG. 3, the pipette is depressurized to a predetermined pressure P0 by actuating the pump 3, and when the predetermined pressure P0 is reached, the central processing unit 8 sends a stop signal to the pump 3 to stop the pump 3. In this state, the central processing unit 8 monitors a pressure change for a predetermined period of time ($\Delta t$), measures a pressure change $\Delta P$ in this $\Delta t$, and judges performance of the pipette P, that is, judges whether there is leakage based on whether the value of $\Delta P$ is not more than or more than a threshold. A result of judgment is displayed on the display unit 9, and then the inspection is finished.

Second Embodiment

FIG. 2 shows a second embodiment, illustrating a configuration in a case where an inspection is conducted by means of pressurization.

The illustrated configuration is substantially the same as the configuration shown in FIG. 1 as described above, however, the pump 3 is set to perform "discharge," and according to this setting of the pump 3, the check valve 4B is set to prevent the air on the pressure vessel 5 side from flowing-back to the pump 3.

In the inspection of the pipette by means of pressurization, the graph shown in FIG. 3 is line-symmetric about the time axis t. Specifically, by pressurizing the pipette at a predetermined pressure and monitoring a pressure change (depressurization) in a predetermined period of time Δt, leakage from the pipette is inspected.

Incidentally, the inspection by means of depressurization of the first embodiment described above is suitable for a performance inspection when the pipette suctions a liquid, and the inspection by means of pressurization of the second embodiment is suitable for an inspection of suctioned liquid discharge performance. As is naturally understood from both drawings, by using this device, both pipette suction and discharge performance inspections can be successively and easily conducted by performing pressurization and depressurization.

Third Embodiment

FIG. 4 and FIG. 5 show a detailed configuration example of the above-described tester.

As is also understood from the entire length of the pipette P, the whole device consists of only lightweight parts such as a pump 3 which is small-sized and the inside of which is also small-sized, an electronic substrate including a central processing unit 8, and a hollow pressure vessel 5, etc., so that the device has a size and a weight that enable the device to be easily carried about. The portion where the filter 10 is disposed is not directly illustrated, however, an attachment position of the filter is a freely designable matter, for example, the filter 10 is disposed in a recess 1' formed on the bottom surface of the case 1 or on the back surface of the case 1.

INDUSTRIAL APPLICABILITY

In the respective embodiments described above, the device of the present invention is described on the assumption that the device is used to conduct a leakage test for a pipette, however, other than such a dispenser, by properly selecting a purpose of use by a user of the device, the device of the present invention is also applicable to wide fields such as an inspection of airtightness of a container required to have airtightness or a space with a comparatively small capacity, and detection of subtle leakage on a line of vacuum piping, etc.

BRIEF DESCRIPTION OF THE DRAWINGS

FIG. 4 show a third embodiment of the present invention, illustrating a detailed configuration example of a device according to the present invention, wherein FIG. 4(A) is a plan view of the device, FIG. 4(B) is a front view, FIG. 4(C) is a left side view, and FIG. 4(D) is a right side view.

DESCRIPTION OF REFERENCE NUMERALS

Figure 1:
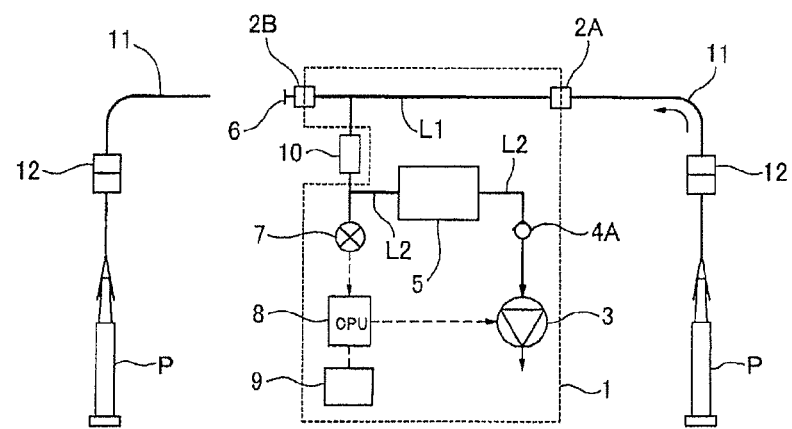
FIG. 1 is a system diagram of a first embodiment of the present invention, illustrating a configuration of a device when being used for depressurization.
Figure 2:
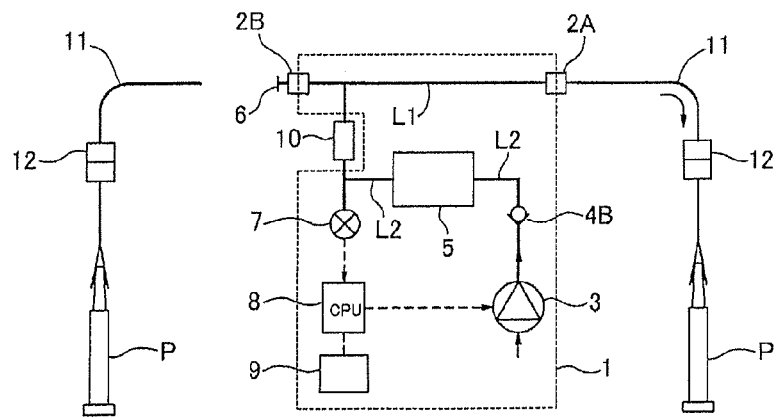
FIG. 2 is a system diagram of a second embodiment of the present invention, illustrating a configuration of a device when being used for pressurization.
Figure 3:
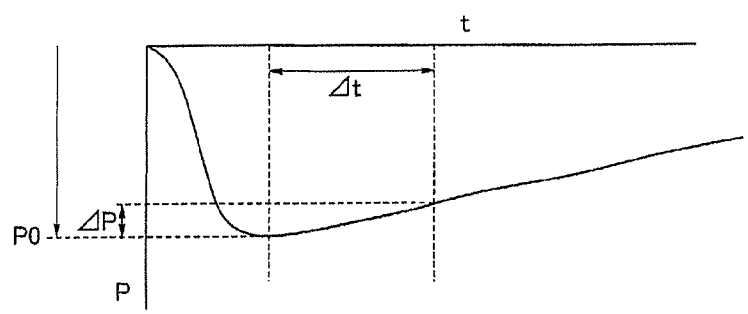
FIG. 3 is a graph showing a depressurization change with time when a leakage test for a pipette is conducted by means of depressurization.
Figure 4:
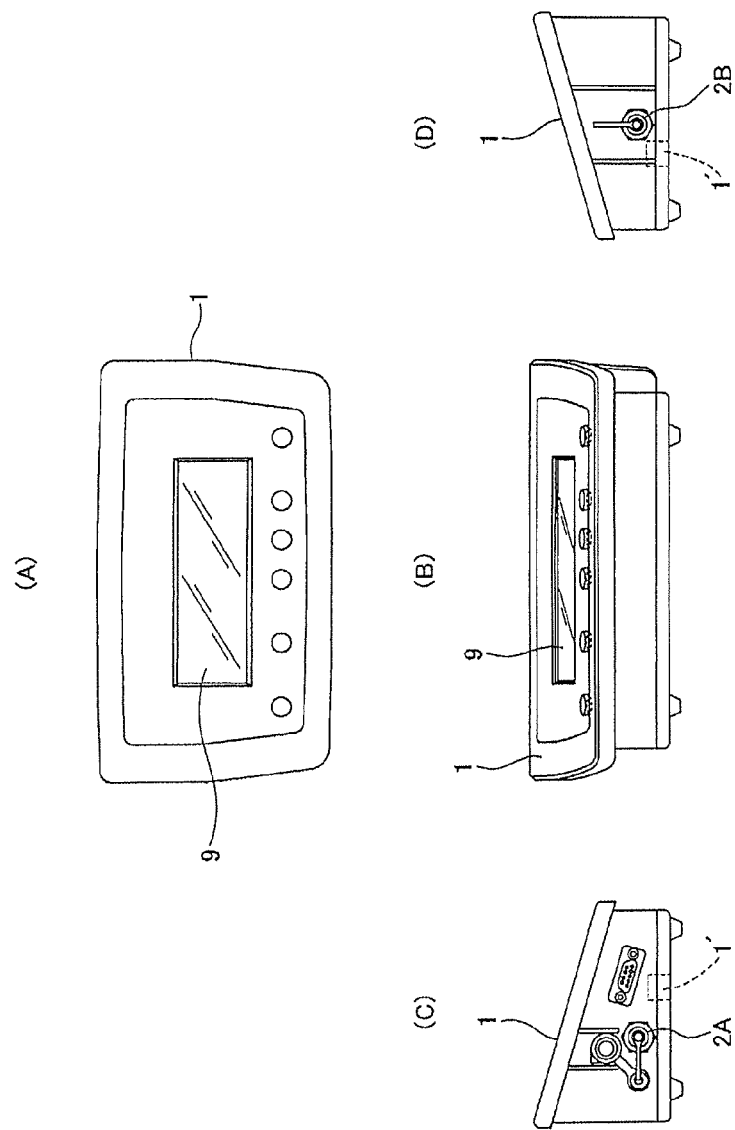
Figure 5:
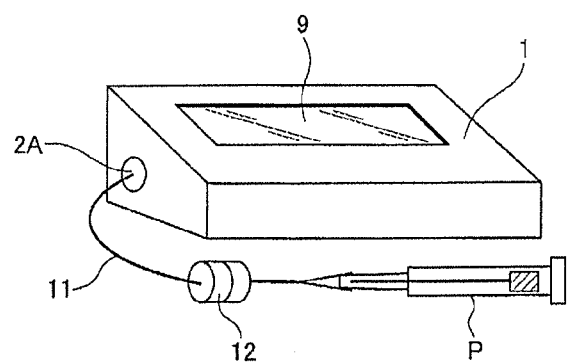
FIG. 5 is a perspective view of the device when a pipette is connected to the device.

1 Case (of testing device)
1' Recess (for filter disposition)
2A, 2B Main body connector
3 Pump
4A, 4B Check valve
5 Pressure vessel
6 Stopper plug
7 Pressure sensor
8 Central processing unit (CPU)
9 Display unit
10 Filter
11 Tube
12 External connector
L1 External connecting duct line
L2 Internal duct line
P Pipette

What is claimed is:

1. A leakage tester for pipettes utilizing pressure for inspecting airtightness of a pipette, comprising:
   a diaphragm pump that is capable of performing at least one of suction and discharge, disposed on one end of a duct in which air flows;
   a main body connector that is formed on the other end of the duct and to be connected to the pipette;
   a pressure sensor for detecting a pressure, and a pressure vessel sized to attenuate pulsations generated by the diaphragm pump, and a check valve disposed between the main body connector and the pump, wherein the main body connector, the pressure vessel, the check valve, and the pump are disposed in this order in the duct;
   wherein a central control unit to which the pressure sensor and the pump are connected, and which judges airtightness of the pipette based on a pressure change inside the combined interior volumes of the pipette and the pressure vessel by controlling the pump, and
   the tester is configured to have a size and shape capable of being held with one hand.

2. The leakage tester for pipettes utilizing pressure according to claim 1, wherein the duct includes an external connecting duct line to be connected to an inspection target and an internal duct line communicating with the external connecting duct line, and a filter is disposed in the external connecting duct line or the internal duct line.

3. The leakage tester for pipettes utilizing pressure according to claim 2, wherein the filter is disposed outside a case of the device, and the filter is removable outside the device.

4. The leakage tester for pipettes utilizing pressure according to claim 1, wherein a plurality of main body connectors are formed on the duct, and a tube to be connected to the pipette is connected by selectively using any of the main body connectors.

\* \* \* \* \*